Dec. 21, 1926.   1,611,706
E. I. ADOLPHSON ET AL
NIGHT TURNING SIGNAL FOR VEHICLES
Filed May 11, 1926

WITNESSES

INVENTOR
Edwin I. Adolphson
William McLean
BY
ATTORNEYS

Patented Dec. 21, 1926.

1,611,706

UNITED STATES PATENT OFFICE.

EDWIN ISAK ADOLPHSON AND WILLIAM McLEAN, OF HONOLULU, TERRITORY OF HAWAII.

NIGHT TURNING SIGNAL FOR VEHICLES.

Application filed May 11, 1926. Serial No. 108,377.

The present invention is concerned with the provision of a novel system of signals adapted to be used on various types of vehicles for indicating at night the intention of the operator of the vehicle to turn either right or left.

The invention finds its preferred embodiment in signals for automobiles, an object of the invention being to provide signal lights which will be visible both to the drivers of approaching cars and to the drivers of following cars. Preferably the signal lights are in the nature of flood lights adapted to strongly illuminate the road at either side of the vehicle depending upon the particular direction in which the driver of the vehicle intends to turn. In a preferred embodiment of the invention, these road illuminating lights are colored, red lights having proven peculiarly suitable for the purpose.

While the lights may be automatically controlled from the steering mechanism of the car, we prefer that they be manually controlled from the dashboard. The particular point at which the lights are mounted will depend upon the particular construction of the automotive vehicle to which they are applied, but we find that the cowl of a car offers one convenient support for the road illuminating signal lights.

Other objects of the invention are to provide signal lights of simple, practical construction, which will be durable and efficient in use, which may be manufactured with comparative economy, and readily installed on all standard makes of automotive vehicles.

With the above noted and other objects in view, the invention consists in certain novel features of construction and combinations and arrangements of parts, as will be more fully hereinafter set forth and pointed out in the claim. The invention may be more fully understood from the following description in connection with the accompanying drawings, wherein—

Figure 1:
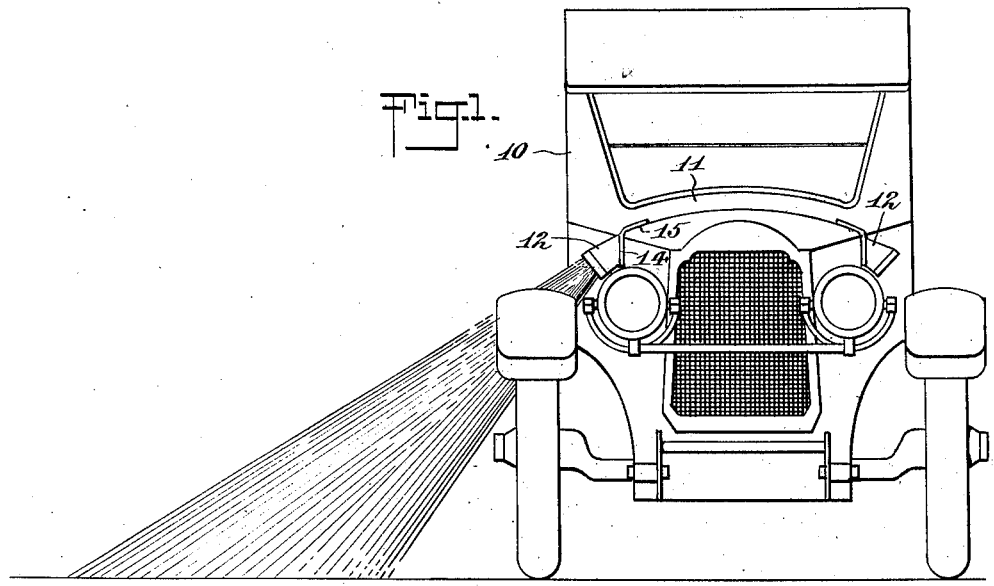
Fig. 1 is a view in front elevation of an automotive vehicle equipped with our improved signal lights.
Figure 2:
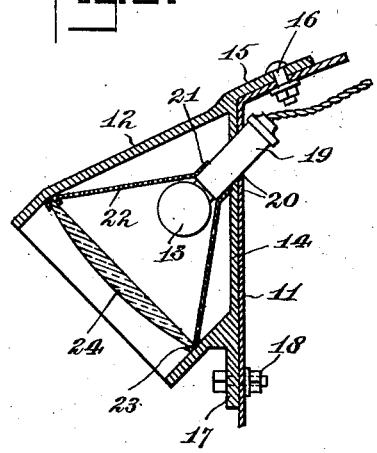
Fig. 2 is a vertical sectional view through one of the light casings.

As above noted the particular position at which the lights are mounted will depend to some extent upon the particular construction of the vehicle with which they are used, and it is to be understood that the lights may be mounted in other positions than that illustrated in the drawings.

An automobile designated generally by the reference character 10 includes the usual cowl 11 between the dashboard and the hood. Signal light casings 12 are mounted at each side of the cowl in such a position that the signal lights 13 which they house, will flood upon the road at one side or the other of the car as indicated in Fig. 1. The signal light casings may conveniently include downwardly inclined cylindrical portions integral with plate portions 14 adapted to lie against the vertical sides of the cowl 11. Flanges 15 integral with the casings overlie the top of the cowl and may be bolted or otherwise removably secured thereto as at 16. Depending lugs or flanges 17 forming continuations of the plate portions 14 of the casings are bolted to the sides of the cowl at 18.

Sockets 19 for the bulbs 13 are mounted in any suitable manner within the casings 12. As illustrated the sockets are secured in aligned openings 20 in the cowl, and the plate 14, and are embraced by collars 21 at the reduced inner ends of conical reflectors 22 housed within the casings. The reflectors 22 may be flanged inwardly at 23 to conveniently retain lenses 24.

The lenses 24 are preferably of colored glass. We have found red glass quite suitable for the purpose, and believe that a light application of deep red color to the lens will give one of the best and most highly visible road illuminations.

Figure 3:
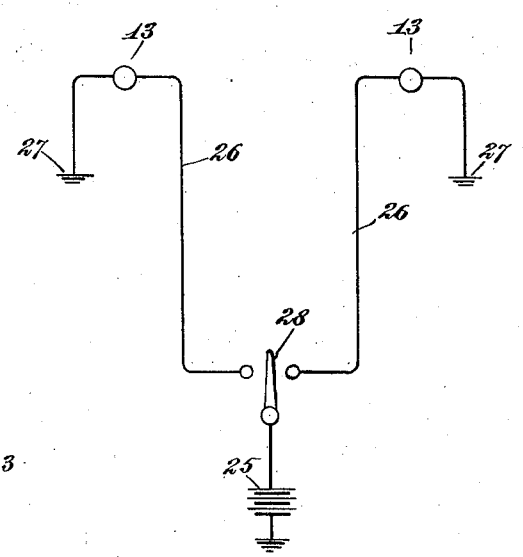
Fig. 3 is a wiring diagram showing the light circuits.
Figure 4:
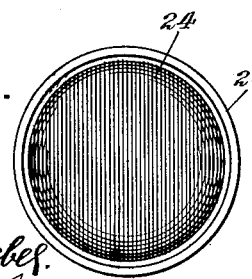
Fig. 4 is a plan view of one of the red lenses.

In Fig. 3 we have illustrated a simple wiring circuit for the signal lights, which circuit is of course subject to a number of variations. In this circuit, 25 represents a battery and 26 leads from the battery to the signal lamps 13. The lamps are grounded at 27 and a circuit from the battery through either lamp may be closed by moving a switch 28 on the dashboard of the car.

In operation the driver of the car selectively manipulates the switch 28 to operate the signal lights, and when a circuit is completed through one of the lights, the road at one side of the car will be flooded with a red illumination visible for some distance to the drivers of approaching or following cars, as well as to traffic officers on duty, pedestrians or others interested in the proposed movements of the car.

It will be noted that the downwardly inclined light casings are so arranged that the eyes of pedestrians are screened from the direct glare of the lights, and the only illumination visible will be the reflected illumination from the road.

Various changes and alterations might be made in the general form and arrangement of parts described without departing from the invention. Hence we do not wish to limit ourselves to the details set forth, but shall consider ourselves at liberty to make such changes and alterations as fairly fall within the spirit and scope of the appended claim.

We claim:

The combination with an automobile, of night turning signal lights mounted on the cowl of the automobile, reflectors, and casings for the lights arranged to direct a broad beam of light downwardly on to the road laterally of the automobile, said casings including flanges overlying and bolted to the upper face of the cowl, plate portions lying against the side faces of the cowl and cylindrical housing portions inclined downwardly and laterally from the cowl.

EDWIN ISAK ADOLPHSON.
WILLIAM McLEAN.